(12) United States Patent
Levin et al.

(10) Patent No.: US 10,972,449 B1
(45) Date of Patent: Apr. 6, 2021

(54) COMMUNICATION WITH COMPONENTS OF SECURE ENVIRONMENT

(71) Applicant: Amazon Technologies, Inc., Seattle, WA (US)

(72) Inventors: Alex Levin, Santa Clara, CA (US); Barak Wasserstrom, Mitzpe Aviv (IL); Georgy Zorik Machulsky, San Jose, CA (US); Saar Gross, Sunnyvale, CA (US); Or Yochanan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 335 days.

(21) Appl. No.: 16/022,271

(22) Filed: Jun. 28, 2018

(51) Int. Cl.
*H04L 29/06* (2006.01)
*G06F 21/44* (2013.01)

(52) U.S. Cl.
CPC ............ *H04L 63/08* (2013.01); *G06F 21/445* (2013.01); *H04L 63/10* (2013.01); *H04L 67/42* (2013.01)

(58) Field of Classification Search
CPC ............... G06F 9/544; G06F 21/445; G06F 2211/003; H04L 63/10; H04L 67/42; H04L 63/08
See application file for complete search history.

(56) References Cited

U.S. PATENT DOCUMENTS

| | | | | |
|---|---|---|---|---|
| 2011/0113426 | A1* | 5/2011 | Kung | G06F 9/45558 718/1 |
| 2012/0143836 | A1* | 6/2012 | Fried | G06F 11/1004 707/697 |
| 2012/0320916 | A1* | 12/2012 | Sebastian | H04N 21/6408 370/390 |
| 2013/0067019 | A1* | 3/2013 | Srinivas | G06F 9/452 709/213 |
| 2015/0324201 | A1* | 11/2015 | Tominaga | G06F 12/0875 712/226 |
| 2016/0092377 | A1* | 3/2016 | Sauer | G06F 12/1458 711/163 |
| 2017/0093853 | A1* | 3/2017 | Boivie | G06F 21/00 |
| 2019/0073316 | A1* | 3/2019 | Sysoev | G06F 12/1009 |

* cited by examiner

*Primary Examiner* — Thaddeus J Plecha
(74) *Attorney, Agent, or Firm* — Weaver Austin Villeneuve & Sampson LLP

(57) ABSTRACT

Disclosed herein are techniques for enabling device communication in a secure environment. In one example, a system comprises a storage in a server, a first component in the server, the first component being isolated in a secure environment in the server, and an entry point device authorized to access the first component via the secure environment. The entry point device may receive a request to access the first component. The entry point device may store a notification in a region of the storage accessible by the first component, wherein the notification is to be read by the first component from the storage to set the first component to an operation mode. The entry point device may store operation data in the storage, wherein the operation data is to be acquired by the first component from the storage to control an operation of the first component in the operation mode.

20 Claims, 8 Drawing Sheets

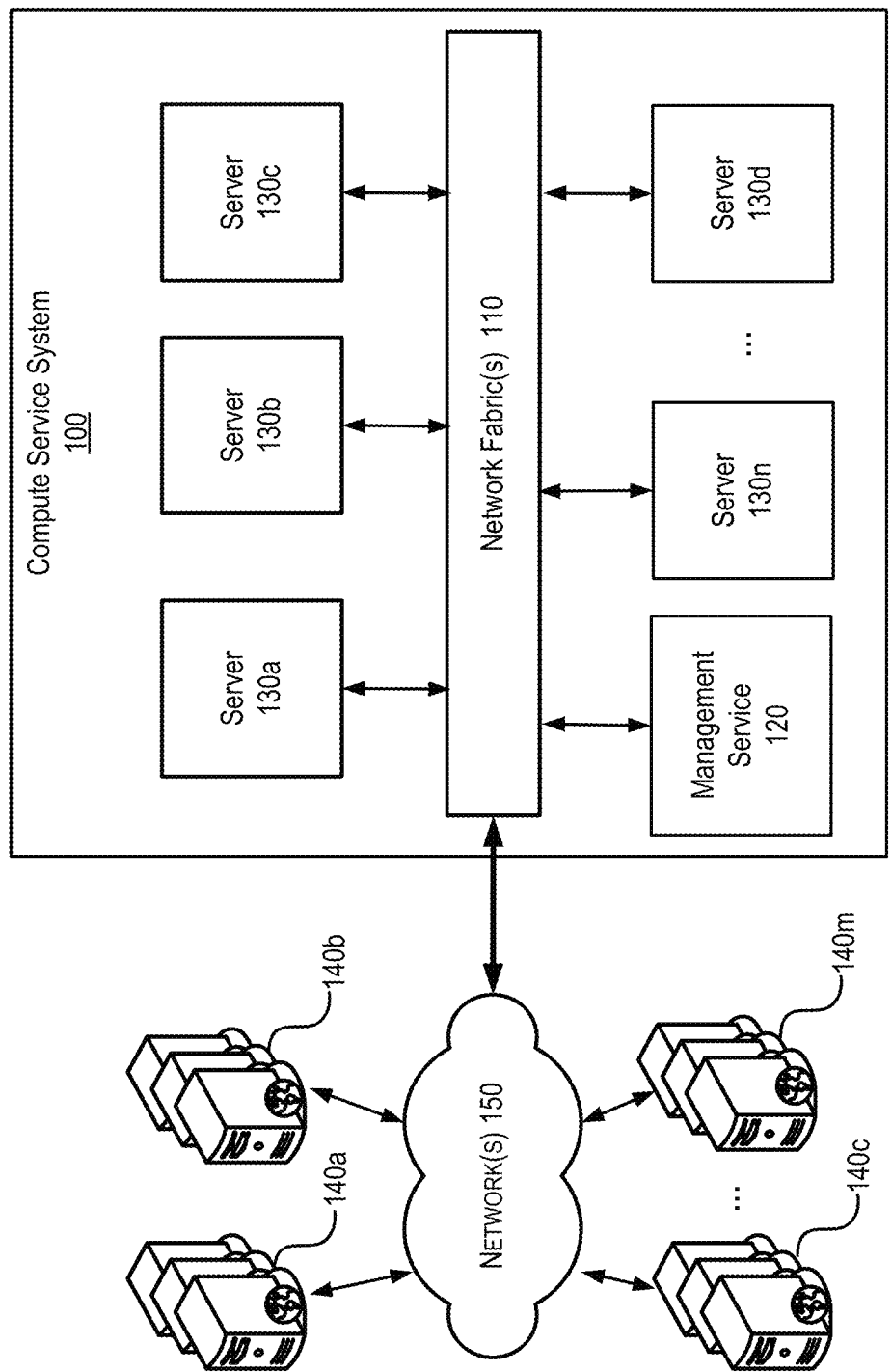

US 10,972,449 B1

COMMUNICATION WITH COMPONENTS OF SECURE ENVIRONMENT

BACKGROUND

Many organizations provide computing services over a plurality of communication networks. The computing services may include, for example, network-based services such as storage and computation services that can be provided over the Internet to different clients. Various software and/or hardware components can be involved to provide the computing services. The various software and/or hardware components can be placed in a secure environment to protect against malicious access. The isolated components may also become inaccessible (or difficult to access) for other purposes such as diagnosis and debugging as a result.

BRIEF DESCRIPTION OF THE DRAWINGS

Various embodiments in accordance with the present disclosure will be described with reference to the drawings, in which:

FIG. 1 illustrates an example compute service system in a network-based service environment, according to certain aspects of the present disclosure;

DETAILED DESCRIPTION

Figure 2A:
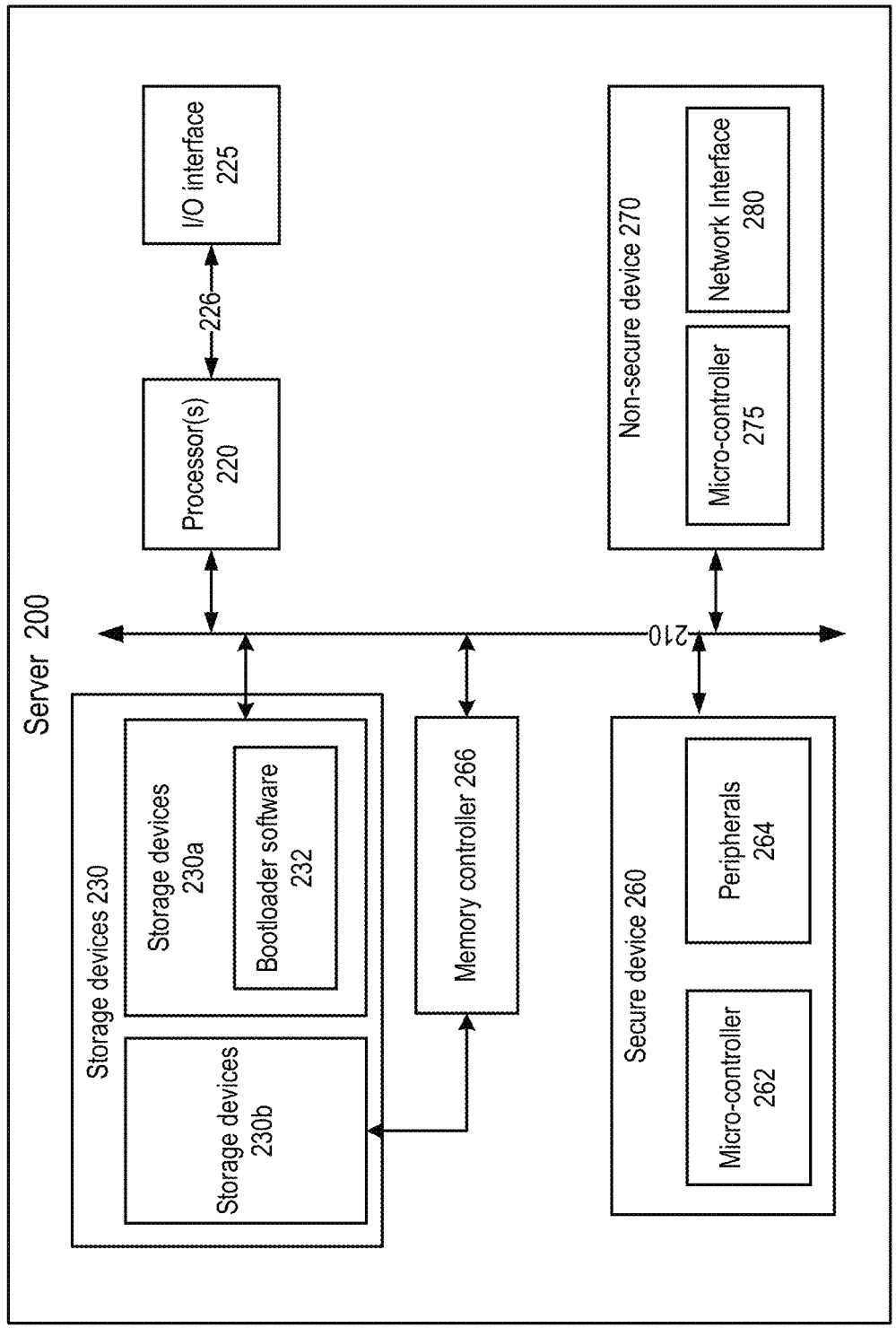
FIG. 2A and FIG. 2B are simplified block diagrams of an example server and its operation in a compute service system, according to certain aspects of the present disclosure.

Examples of the present disclosure relate to systems and methods for performing communication with hardware and/or software components of a secure environment. In some examples, a system may include a storage device and a first device. The first device may include a hardware component and/or a software component and is involved in the provision of a compute service. The first device can be isolated in a secure environment to protect against unauthorized access. The system further comprises an entry-point device authorized to access the storage device via the secure environment. The entry-point device is further configured to receive a request to access the first device, and responsive to receiving the request to access the first device, store a notification in a region of the storage device accessible by the first device. The notification is to be acquired by the first device from the storage device. The entry-point device is further configured to store, in the region of the storage device, control data to be acquired by the first device based on the notification, the control data being configured to control a function of the first device.

A compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably without necessarily implying a commercial relationship. The term "instance" may refer to, for example, an instance that executed directly on server hardware or as a virtual machine. Different types of instances generally correspond to different hardware functions or components.

Typically, the operator of the compute service uses its own virtualization system (e.g., a hypervisor or virtual machine monitor) on the servers and the clients only receive access to the instances. In some cases, a client may prefer to run directly on the server's hardware or use its own virtualization system to instantiate its own virtual machines as needed. For example, a client may want to use a particular hypervisor, make specific changes to a commercially available hypervisor to enable certain models, or prefer one hypervisor over another, e.g., Microsoft Hyper-V® over VMware vSphere® or open-source Kernel-based Virtual Machine (KVM). In addition, in a virtualized compute service system, performance degradation may occur due to the introduction of a hypervisor layer. While the hypervisor enables the visibility, flexibility, and management capabilities required to run multiple virtual machines on the same resources, it also creates additional processing overhead and may not integrate with tools the user wants to use with the hypervisor. However, if access to the hardware is granted a customer could potentially damage the hardware or attempt to modify the firmware to attack future customers that use the hardware. For example, in bare-metal environment, a customer may try to modify the firmware on the server to adversely affect the execution environment when the server is rebooted and rented to a second customer. The firmware may, for example, direct data on the server to an unsecure location, thus compromising the security of the data of the second client on the server.

To protect against the aforementioned security threats (or other forms of unauthorized access) of the hardware and software resources of a compute service system, the resources can be isolated in a secure environment. The secure environment is accessible via an entry-point device, which can be configured to regulate the access to those resources. The secure environment can be implemented in various forms and can be hardware-based, software-based, or a combination of both. For example, the hardware resources can be hosted within a server, and the server includes a secure hardware bus electrically connected to each of the hardware resources. Each of the hardware resources can transmit and receive signals using the secure hardware bus. The secure hardware bus can be accessible externally via the entry point device (e.g., a network adapter device also being electrically connected to the secure hardware bus) but not via other devices. To enhance security, the entry point device may be allowed to transmit a limited set of signals and/or data (e.g., signals/data that conform with the bus protocol) to the hardware resources via the secure hardware bus.

As another example, a memory device may store a firmware, such as a bootloader program (e.g., uBoot), which can be executed by a hardware processor of the server to load an operating system when the server starts up. To enhance security, the hardware processor can read the memory device for the bootloader program only when the hardware processor is configured to have a particular privilege state. In this case, the memory device (or a region of it) that stores the bootloader program is also isolated in a secure environment, and the hardware processor can be configured an entry point device to access the bootloader program when having the particular privilege state.

In the above examples, the entry point device can be accessible by a customer, a manager of the server, or both, with each having a different scope of access of the hardware and software resources via the entry point device. For example, an operator can log into the entry point device providing his/her credential information. Based on the credential information, the entry point device can identify the operator as either a customer or a manager, and provide different scope of access by, for example, setting different privilege state, controlling which of the hardware resources available for communication via the secure hardware bus, etc.

Although the secure environment can protect the hardware and software resources against potential security threats or other authorized accesses, the secure environment can also impede other operations that are essential for these hardware and software resources including, for example, maintenance, troubleshooting, etc. As an example, the secure hardware bus may allow the entry point device to access only certain functions of the hardware devices but not their configurations. The secure hardware bus may also be incapable of transmitting data related to maintenance and troubleshooting due to, for example, bandwidth limitation, protocol limitation, etc. As another example, the hardware processor may have the requisite privilege state to perform read operations to the memory device to obtain the bootloader program for execution. However, the hardware processor may not have requisite privilege state to update the bootloader program stored in the memory device. All these can add substantial difficulties and complexity to the maintenance and troubleshooting operations, and can affect the operation of the server as well as the provision of the compute service. For example, in order to troubleshoot a hardware/software component of the secure environment, the server may need to be powered down with the compute service suspended, and the component may need to be physically separated from the secure environment for the troubleshooting operation.

As mentioned above, examples of the present disclosure relate to systems and methods for performing communication with hardware and/or software components of a secure environment. In some examples, a system may include a memory and a first device. The first device may include a hardware component and a software component and may be involved in the provision of a compute service. The first device can be isolated in a secure environment to protect against unauthorized access. The system further comprises an entry-point device authorized to access the memory device via the secure environment. The entry-point device is further configured to receive a request to access the first device, and responsive to receiving the request to access the first device, store a notification in a region of the memory device accessible by the first device. The notification is to be acquired by the first device from the memory device. The entry-point device is further configured to store, in the region of the memory device, control data to be acquired by the first device based on the notification, the control data being configured to control a function of the first device.

With the disclosed examples, an operator can establish a communication channel, using an entry point device, with a device isolated in a secure environment (herein after, "isolated device") by performing read and write operations to a memory configured as communication space. The communication space can be accessible by both the isolated device and the entry point device. Such arrangements facilitate the performance of critical operations to the hardware and/or software component of the isolated device while overcoming the limitations posted by the secure environment. For example, the operator can use the entry point device (e.g., a network adapter device) to establish a debug session with the isolated device remotely over a network. The operator can store a notification at the communication space to notify the isolated device to establish the debug session. The operator can also store commands to the isolated device to request certain data related to debugging and/or troubleshooting at the memory. The isolated device, upon acquiring the notification from the memory, can enter a pre-determined operation mode to establish the debug session. The isolated device can also acquire the commands from the communication space and respond by storing the requested data at the communication space. The entry point device can then acquire the requested data from the communication space and transmit the requested data to the remote operator over the network. With such arrangements, the debug session can occur without the server being powered down and/or without other compute services unrelated to the isolated device being disrupted.

As another example, the operator can use the hardware processor as an entry point device to update the bootloader codes stored in a firmware memory device using the communication space. The operator can use the entry point device to store a new set of bootloader codes as well as a notification at the communication space. A memory controller of another memory (e.g., a firmware memory device) can acquire the notification. Based on the notification, the memory controller can acquire the new set of bootloader codes from the communication space, and update the bootloader codes stored in the firmware memory device with the new set of bootloader codes. With such arrangements, the updating of the bootloader codes (or other firmware codes) can be performed using the entry point device and without the need to physically separate the firmware memory device from the server.

Moreover, the memory-based communication between the entry point device and the isolated device, as to be described in this disclosure, can maintain or even enhance the security provided by the secure environment. For example, the communication space can be part of the secure environment which is accessible only via the entry point device. In some examples, prior to the communication a handshake process can be performed, in which the entry point device and the isolated device can exchange data via the communication space, to confirm that the entry point device is authenticated and authorized to communicate with the isolated device. The handshake process can protect against security threats posed by, for example, a malicious user using the entry point device to modify the system for malicious purposes.

In the description herein, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example compute service system 100 in a network-based service environment, according to certain aspects of the present disclosure. In the network-based service environment, one or more clients may utilize client devices 140a-140m (collectively, client devices 140) to access compute service system 100 via one or more networks 150. For example, client devices 140 may access compute service system 100 using a web browser, a command line interface, or a web service API. Client devices 140 may include any appropriate device operable to send and receive requests, messages, or other information over an appropriate network 150 and convey information back to a client of the device, such as, but not limited to, a mobile phone, a smart phone, a Personal Digital Assistant (PDA), a laptop computer, a desktop computer, a thin-client device, a tablet, an electronic book (e-book) reader, etc.

In some examples, networks 150 may include any one or a combination of many different types of networks, such as cable networks, the Internet, wireless networks, cellular networks, and other private and/or public networks. Communications over the networks may be enabled by wired or wireless connections and combinations thereof. Networks 150 may support communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk®.

Compute service system 100 may include a management service 120 and a plurality of servers 130a, 130b, 130c, 130d, . . . , and 130n (collectively, servers 130) in a distributed computing environment. Management service 120 and servers 130 may be communicatively coupled to one or more network fabrics 110, which may be connected to networks 150 through, for example, high speed network connection, such as InfiniBand, Data Center Ethernet (DCE), gigabit Ethernet, fiber channel, or Fiber Channel over Ethernet (FCoE) etc. Network fabrics 110 may be any appropriate network, including an intranet, the Internet, a cellular network, a local area network, or any combination thereof. Network fabrics 110 may support communications using any of a variety of high speed communication protocols.

Servers 130 may include one or more servers or servers, arranged in a cluster as a server farm, or as individual servers not associated with one another. These servers may be configured to host instances. In some implementations, each server of servers 130 may have identical or similar hardware components. In some implementations, servers 130 may include a plurality of different types of servers that may have different components and/or configurations.

Management service 120 may be a server or platform that is configured to manage a pool of heterogeneous resources (e.g., servers or specialized hardware resources), provide access to clients and end users, monitor security, and manage resource allocation. For example, management service 120 may receive requests from client devices 140 and select one or more servers 130 to provision the requested instance based on the specific request from the client. In some cases, management service 120 may allocate a predetermined number of resources to a client who may pay a flat fee or a monthly fee. In some cases, for a client that is charged on a pay-per-use basis, management service 120 may allocate resources to the client when the client needs them and decommission them when they are no longer needed, such that the resources can be allocated to other clients. Management service 120 may include a network interface for communication with network fabrics 110, a database for storing configurations and status of servers 130 connected to network fabrics 110, and a processing logic for selecting one or more available servers for an instance and performing other management functions.

As described above, client devices 140 may request different types of instances (e.g., virtual machines or servers) from compute service system 100. For example, in some cases, a client may request an instance to perform complex computational workloads, such as batch processing, distributed analytics, high performance scientific or engineering applications, gaming, or video-encoding. In some cases, a client may request an instance for applications sensitive to network performance.

In some cases, a client may request a specific system hardware configuration. For example, the client may specify the number of processor cores, the size of the memory, the size of the storage device (e.g., a solid state drive (SSD)), and/or the operating system or Virtual Machine Monitor (VMM, i.e., hypervisor) needed for the applications. In some cases, the client may select a type of instance from multiple types of instances offered by the compute service system. For example, a compute service provider may offer different types or families of instances based on compute, memory, and storage capabilities, where different types of instances may provide different capabilities on computing performance, I/O performance, memory size and performance, storage size and performance, network performance, and graphic processing performance. And, in some cases, the client may request a particular operating system or hypervisor to run on the server, such as Microsoft Windows®, Linux, Microsoft Hyper-V®, Xen®, or VMware vSphere®. In some cases, the client may request a specific type of hardware, such as GPUs or SSDs. As such, in embodiments of the present disclosure the compute service provider may offer one or more "bare-metal" instance types. The bare-metal instance types can have differing combinations of hardware.

In some cases, a client's workloads and applications may demand higher performance than the virtualization layer allows, or the client may want to use a different virtualization system on hardware managed by the compute service provider. The client may rent a server as a bare-metal instance and use its own operating system on the server, in order to remove the hypervisor and the performance impact caused by virtualization. The hardware of the bare-metal instance may be fully dedicated to the client, including any additional storage, during the time period that the sever is rented to the client.

In response to web-service requests for a bare-metal instance from a client, management service 120 may select one or more servers to allocate to the client. For example, in implementations where the servers may have different hardware resources, management service 120 may select a server that best matches the requirement of the client-requested instance with minimum extra resources. In implementations where all servers have the same or similar hardware resources, management service 120 may randomly select any available server, or a cluster of available servers that are closely located. In some implementations, management service 120 may select a server that is capable of provisioning a bare-metal instance.

FIG. 2A is a simplified block diagram of an example server 200 in a compute service system, according to certain aspects of the present disclosure. Many components or modules of server 200 are omitted in FIG. 2A in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present disclosure. Still further, the illustrative components of server 200 may be logical in nature such that the physical implementation of one or more components can be varied or such that one or more of the logical components may be implemented in a virtualized manner. Additionally, one or more servers 200 may share one or more of the illustrated or unillustrated components, such as processors, graphical processing units, memory, storage, and the like.

Server 200 may be a server, for example, an x86 server. Server 200 may include one or more processor(s) 220, which may include, for example, one or more x86 processor cores, or other circuits capable of executing machine-readable instructions. As part of the provisioned compute service, processor(s) 220 may execute instructions related to the compute service for a tenant. Processor(s) 220 can also be configured to provide hardware resources to, for example, execute software provided by the tenant. In some examples, processor(s) 220 may also include GPUs. Processor(s) 220 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in processor(s) 220 may include processors developed by ARM®, MIPS®, AMD®, Intel®, Qualcomm®, and the like. In certain implementations, processor(s) 220 may include multiple processors or processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, buses, level 1 (L1) caches, and/or level 2 (L2) caches. The instructions executed by processor(s) 220 may be stored on a computer-readable storage medium, for example, in the form of a computer program.

As shown in FIG. 2A, processor(s) 220 may be coupled with a communication channel 210 and may communicate with other components of server 200 via communication channel 210. Communication channels 210 may include one or more buses, meshes, matrices, fabrics, a combination of these communication channels, or some other suitable communication channels. For example, communication channel 210 may correspond to a shared bus (e.g., a front side bus, a memory bus), a point-to-point bus such as a PCI or PCIe bus, Serial Peripheral Interface (SPI) buses, Inter-Integrated Circuit (I2C) bus, Serial Advanced Technology Attachment (SATA) buses, etc., in which the components of server 200 communicate.

As another example, communication channel 210 also includes a baseboard management controller (BMC) (not shown in FIG. 2A) for managing the operation of server 200 in accordance with, for example, the Intelligent Platform Management Interface (IPMI) standard. The BMC may include processing logic that monitors the physical states of server 200 using sensors, and may also provide management and monitoring capabilities independently of processor(s) 220, the firmware (e.g., Basic Input/Output System (BIOS)), and the operating system of server 200. BMC 240 may be used by system administrators for monitoring and managing the operations of server 200, using, for example, IPMI interfaces. For example, a system administrator may, using the BMC through IPMI interfaces, manage a server that may be powered off or otherwise unresponsive through a network connection to the BMC, or login independent of the operating system to manage server 200 remotely even in the absence of an operating system or a system management software. System administrators may use the BMC to monitor status of server 200, such as temperatures, voltages, fans, power supplies, and chassis intrusion; identify devices and query real-time inventory information of server 200; review hardware logs; or take some corrective actions, for example, performing recovery procedures such as resetting or rebooting server 200 to get a hung operating system running again or power down server 200 if necessary, from a remote console through a secure network connection with the BMC. In this way, a system administrator can remotely manage numerous servers and other devices simultaneously, saving on the overall operating cost of the network and helping to ensure its reliability.

In addition, processor(s) 220 can also be coupled with an I/O interface 225 via a communication channel 226. I/O interface 225 may be coupled with an I/O device (e.g., a keyboard, a mouse, etc.). I/O interface 225 can receive input data (e.g., a set of American Standard Code for Information Interchange (ASCII) codes typed on the keyboard) from the I/O device and transmit the input data to processor(s) 220 via communication channel 226. In some examples, communication channel 226 can include the same type of bus as communication channel 210, or other types of buses. For example, each of processor(s) 220 and I/O interface 225 may include an universal asynchronous receiver-transmitter (UART) device coupled with a set of hardware buses configured to provide communication channel 226.

Server 200 may also include storage devices 230. Storage devices 230 may include multiple storage devices (e.g., storage devices 230a and 230b) and may include, for example, both volatile and non-volatile storage devices. Storage devices 230 may include different types of volatile and non-volatile storage devices. For example, storage devices 230a can include non-volatile memory devices such as, for example, a flash memory, a read-only memory (ROM), a solid-state drive (SSD), storage-class memory (SCM), etc. Storage devices 230b can include volatile memory devices such as, for example, a random access memory (RAM), dynamic random access memory (DRAM), a synchronous dynamic random-access memory (SDRAM), such as double data rate (DDR), DDR2, DDR3, or DDR4 SDRAM, etc. In some examples, storage devices 230b may include several levels of cache hierarchy, such as Level 1 (L1) caches, Level 2 (L2) caches, Level 3 (L3), or last level caches. Storage devices 230a may be directly accessible to (or in communication with) a number of components of server 200, such as processor(s) 220, and the like, via communication channel 210. Storage devices 230b may be accessible to the components of server 200 via a memory controller 266, which can manage access of storage devices 230b. For example, memory controller 266 can receive access request (e.g., a write request, a read request, etc.) from a requester device of server 200 (e.g. processor(s) 220) over communication channel 210 and perform the requested access to storage devices 230b. Memory controller 266 can also transmit the result of the access (e.g., read data from storage devices 230b) back to the requester device via communication channel 210. In some examples, memory controller 266 may also include or interface with a direct memory access (DMA) controller to establish DMA channels with storage devices 230b, to enable the devices of server 200 to access storage devices 230b using DMA descriptors.

Storage devices 230 can be used to store executable code, often referred to as firmware, which can be executed by processor(s) 220 to cause components of server 200 to initialize and identify system devices such as the video display card, keyboard and mouse, hard disk drive, optical disc drive, and other hardware. Storage devices 230 can also store configuration data specific to the tenants, such as account information. Further, as shown in FIG. 2A, storage devices 230 may also include or locate bootloader software 232 that may be utilized to boot server 200. For example, in one embodiment, storage devices 230 may include executable code that, when executed by processor(s) 220, causes server 200 to attempt to locate Preboot Execution Environment (PXE) boot software.

Server 200 may also include a number of devices of which accessibility can be selectively regulated by a secure environment, which can be implemented as part of communication channel 210. For example, as shown in FIG. 2A, server 200 may include a secure device 260 and a non-secure device 270. Secure device 260 may be accessible via communication channel 210 only by a selected group of users (e.g., managers, tenants having special permission, etc.) and by components of server 200 having a pre-determined configuration, whereas non-secure device 270 may be accessible by other users outside of that selected group. Moreover, non-secure device 270 may also be prohibited by the secure environment from directly accessing secure device 260.

In some examples, secure device 260 may include, for example, processors 262 and peripherals 264 which are accessible via communication channel 210 only by the selected group of users and/or by components of server 200 having a pre-determined configuration. For example, secure device 260 may be accessible by processor(s) 220 only when processor(s) 220 is configured to have a pre-determined privilege level (e.g., when operated by managers, tenants having special permission, etc.) but not accessible by processor(s) 220 only when processor(s) 220 is configured to have a lower privilege level (e.g., when operated by tenants without the special permission). For example, secure devices 260 may include sensor devices to be accessed only by the BMC of communication channel 210 to provide state information of server 200 to the manager, but the sensor devices are inaccessible to other users or components of server 200. As another example, peripherals 264 may provide, for example, network storage resources, output resources (e.g., printers), etc., to users and a selected group of tenants, but not to the public or tenants not part of the selected group.

Moreover, non-secure device 270 can be accessible by, for example, every tenant of server 200 including tenants without special permission to access secure device 260. Non-secure device 270 may be coupled with communication channel 210, but can be prevented from accessing secure device 260 directly via communication channel 210. Non-secure device 270 may also be prevented from accessing regions of storage devices 230 that store sensitive and mission-critical data directly via communication channel 210. For example, non-secure device 270 can be prevented from accessing a region of storage device 230a that stores bootloader software 232.

In some examples, non-secure device 270 may include an adapter device which may include one or more network interfaces 280. Network interfaces 280 can provide non-secure remote access (e.g., to every tenant of server 200 including tenants without special permission to access secure device 260) to the computing and networking resources hosted on non-secure device 270. Network interface 280 may include hardware and/or software for communicating with a network. Network interface 280 may also provide network connectivity to processor(s) 220. Network interface 280 may, for example, include physical connectors or physical network ports for wired connection to a network, and/or antennas for wireless communication to a network. Network interface 280 may further include hardware and/or software configured to implement a network protocol stack based on a network protocol including, for example, TCP/IP, InfiniBand, RDMA, UDP, HDLC, FDDI, PPP, etc. Non-secure device 270 may further include a micro-controller 275, which can include a processor or other processing logic capable of executing instructions. Non-secure device 270 may further include memory (not shown in FIG. 2A) including non-volatile memory (e.g., flash memory) and volatile memory (e.g., RAM).

In some examples, non-secure device 270 may be coupled to communication channel 210 of server 200 using, for example, a plug-in card or soldered to the motherboard of server 200. The interface between non-secure device 270 and communication channel 210 can include, for example, Peripheral Component Interconnect (PCI) interfaces, PCI Express (PCIe) interfaces, PCI Extended (PCI-X) interfaces, or any other suitable interfaces. Non-secure device 270 may provide remote access to one or more components of server 200 via network interface 280. For example, non-secure device 270 may enable a remote device to access processor(s) 220, storage devices 230, etc. via network interface 280. Non-secure device 270 may also provide other functions including, for example, traffic monitoring, traffic shaping, computing, billing, encryption, etc. Non-secure device 270 may also provide physical and virtual services to server 200 and/or virtual processes running on processor(s) 220. In some examples, non-secure device 270 may communicate as a standard bridge component for facilitating access between various physical and emulated components of server 200 and one or more network fabrics, such as network fabrics 110, using network interface 280. In some embodiments, non-secure device 270 may be implemented using multiple discrete hardware elements, such as multiple cards, multiple integrated circuits, or other devices. In some embodiments, non-secure device 270 may be attached externally to server 200. In some embodiments, non-secure device 270 may be integrated into server 200. In various embodiments, non-secure device 270 may include reconfigurable hardware resources such that they can be dynamically configured into different hardware configurations or to provide different hardware functionalities.

In some implementations, non-secure device 270 may be a PCI-based device. In these implementations, non-secure device 270 may include a PCI interface for communicating with other components of server 200. The term "PCI" may be used to describe any protocol in the PCI family of bus protocols, including the original PCI standard, AGP, PCIe, and PCI-X. The PCI protocols are standard bus protocols for connecting local peripheral devices to servers. A standard bus protocol is a data transfer protocol for which a specification has been defined and adopted by various manufacturers. Manufacturers ensure that compliant devices are compatible with computing systems implementing the bus protocol and vice versa. As used herein, PCI-based devices also include devices that communicate using Non-Volatile Memory Express (NVMe), which is a device interface specification for accessing non-volatile storage media attached to a computing system using PCIe.

The secure environment in server 200 can be implemented with different components of the server, including non-secure device 270 and processor(s) 220. For example, each of non-secure device 270 and processor(s) 220 can operate as an entry point device to the secure environment. The entry point device can perform a policing function to regulate access to other devices of server 200. For example, non-secure device 270 can determine whether to grant or deny remote access, received over network interface 280, to the devices connected to communication channel 210. Non-secure device 270 may deny a tenant's remote access request (via network interface 280 and communication channel 210) to part of storage devices 230 that stores configuration data for other tenants and bootloader software 232, as well as secure device 260. Non-secure device 270 may allow remote access to processor(s) 220 and part of storage devices 230 to a tenant. In addition, processor(s) 220 also be an entry point which can be accessed via I/O interface 225. Processor(s) 220 may be allowed to perform read access to storage devices 230*a* that store bootloader software 232 but not write access. Processor(s) 220 may also be disallowed from communicating with secure device 260.

In some examples, the policing function can also be implemented as part of communication channel 210, as part of memory controller 266, etc. For example, communication channel 210 may include processing logic such as a controller, a multiplexor circuit, etc. (not shown in FIG. 2A) to implement a policy of routing and/or forwarding communication data among components of server 200. The routing and forwarding decision can be configured using another communication channel implemented on a relatively slower bus (e.g., I2C bus) to open or close communication channel 210 to certain type of communication data. For example, the processing logic can be configured to block unauthorized communication data from non-secure device 270 from reaching secure device 260. Further, memory controller 266 can also be instructed to ignore an access request from non-secure device 270 and/or processor(s) 220 to access certain region of storage devices 230*b*.

Figure 2B:
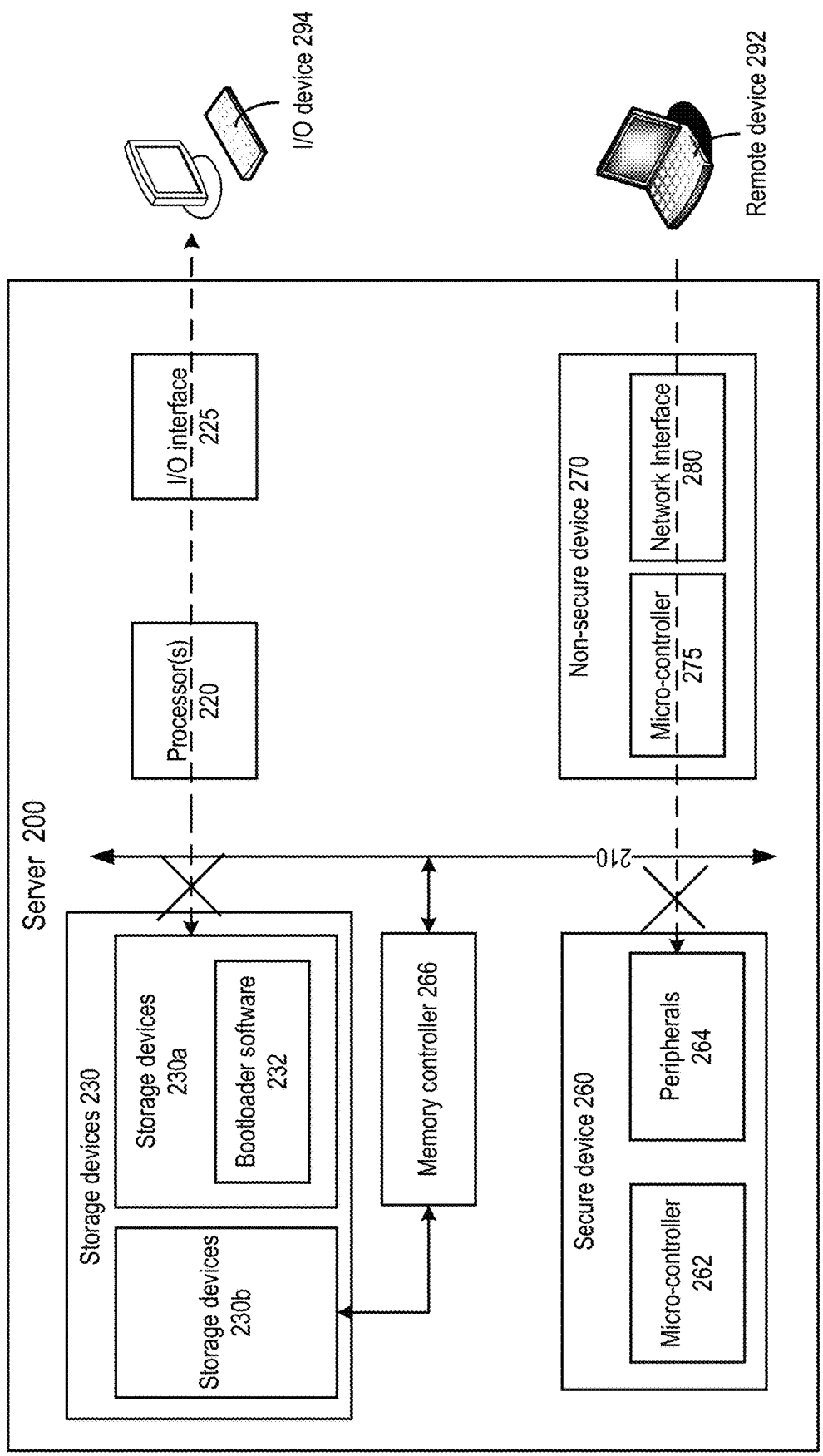

Although the secure environment can protect the hardware and software resources of server 200 against potential security threats or other authorized accesses, the secure environment can also impede other operations that are essential for these hardware and software resources, such as maintenance and troubleshooting. FIG. 2B illustrates potential limitations posed by the secure environment of server 200 to the maintenance and troubleshooting operations for different devices of server 200. For example, as shown in FIG. 2B, an operator may wish to troubleshoot secure device 260 or to update bootloader software 232. The operator may like to perform the troubleshooting and software update remotely using a remote device 292. For example, the operator may want to use remote device 292 to communicate with secure device 260, storage devices 230*a*, etc. via network interface 280. The operator may also like to perform the troubleshooting locally via I/O interface 225 and an I/O device 294, by typing in text commands which can then be forwarded by processor(s) 220 to secure device 260.

But the secure environment of server 200 may prevent both of the remote troubleshooting and software update operations (via non-secure device 270) and local troubleshooting operations (via I/O interface 225). For example, as described above, non-secure device 270 may disallow remote access request targeted at secure device 260. As another example, the communication data is incompatible with the hardware bus that implement communication channel 210. For example, the hardware bus (e.g., PCIE) may provide access to certain function of secure device 260, but not transmit communication data targeted at other part of secure device 260. Moreover, in some examples, processor(s) 220 may be disallowed from updating bootloader software 232 at storage devices 230*a* by, for example, a controller that manages communication channel 210. As a result, as shown in FIG. 2B, remote device 292 cannot communicate directly with secure device 260 via communication channel 210 to perform trouble shooting. Moreover, I/O device 294 cannot communicate directly with storage devices 230*a* via communication channel 210 to update bootloader software 232.

In order to troubleshoot secure device 260 and to update bootloader software 232, both storage devices 230*a* and secure device 260 may need to be separated from the secure environment in order to perform the troubleshooting and software update operations. As a result, the complexity of the troubleshooting and software update operations increases, while the server may need to be powered down for the troubleshooting and software update operations to take place, which can interrupt the provision of the compute services.

Figure 3:
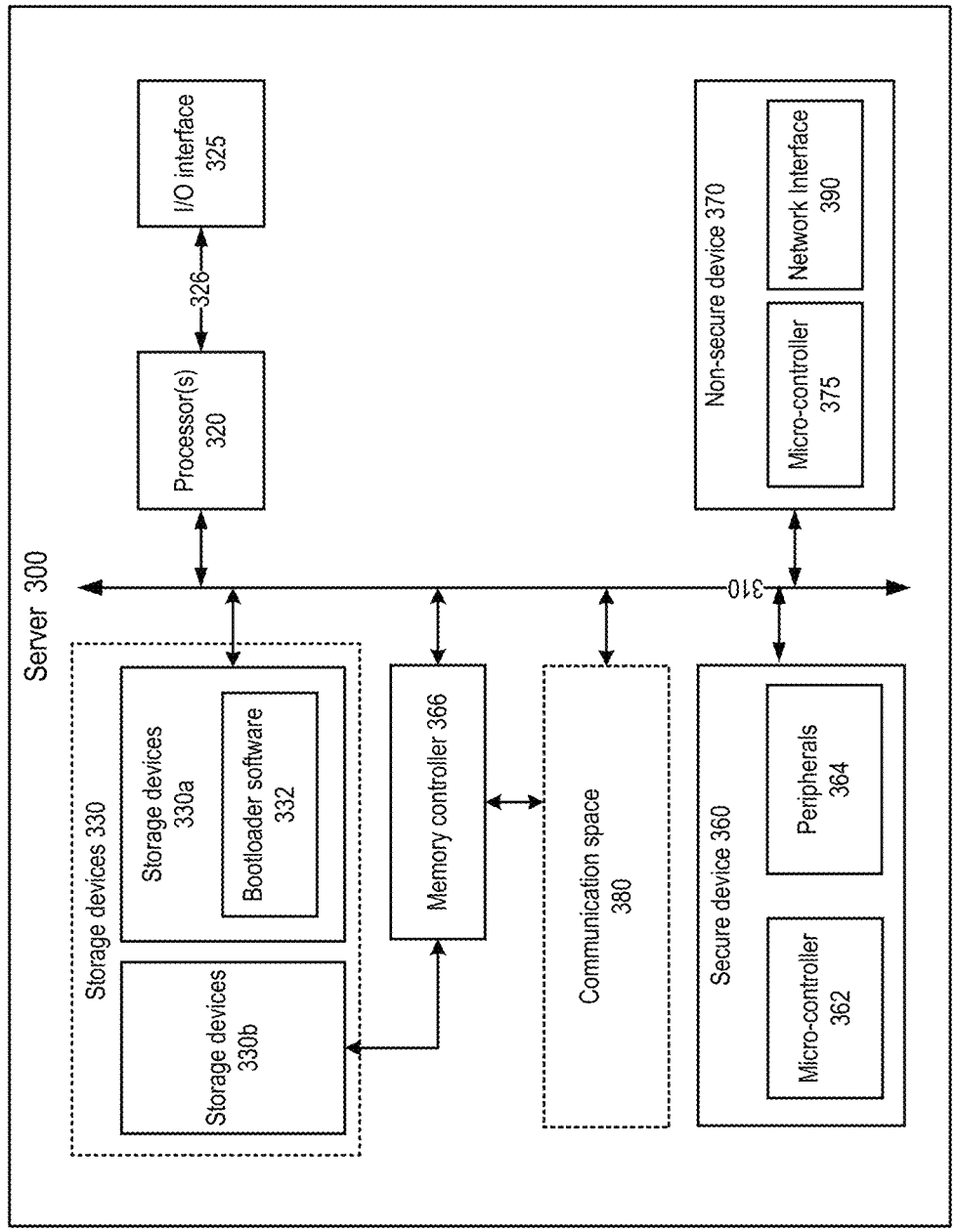
FIG. 3 illustrates an example server configured to enable communication with some of its internal devices in a secure environment, according to certain aspects of the present disclosure.

FIG. 3 is a simplified block diagram of an example server 300, according to certain aspects of the present disclosure. Server 300 can be a server in a compute service system and can include components that operate similarly to the components of server 200 to provide compute services. For example, server 300 includes processor(s) 320, storage devices 330, a secure device 360, a memory controller 366, and a non-secure device 370. Each of these components can perform similar operations to provide a compute service and can have similar structures as, respectively, processor(s) 220, storage devices 230, secure device 260, memory controller 266, and non-secure device 270 of FIG. 2A as described above. For example, similar to storage devices 230 of FIG. 2A, storage devices 330 may include storage devices 330*a* and 330*b*, where storage devices 330*a* can store bootloader software 332 and storage devices 330*b* can be managed by and accessible via memory controller 366. Storage devices 330 may include a non-volatile memory device such as, for example, a flash memory, a read-only memory (ROM), storage-class memory (SCM), etc. Storage devices 330 may also include a volatile memory device such as, for example, a random access memory (RAM), dynamic random access memory (DRAM), a synchronous dynamic random-access memory (SDRAM), such as double data rate (DDR), DDR2, DDR3, or DDR4 SDRAM, etc.

In addition, server 300 may also include a number of devices of which accessibility can be selectively regulated by a secure environment, which can be implemented as part of communication channel 310. For example, secure device 360 may include, for example, processors 362 and peripherals 364 which are accessible via communication channel 310 only by the selected group of users and/or by components of server 300 having a pre-determined configuration. Moreover, non-secure device 370 may be accessible by other users outside of that selected group and may be prohibited by the secure environment from directly accessing secure device 360. Communication channel 310 may include a shared bus (e.g., a front side bus, a memory bus), a point-to-point bus such as a PCI or PCIe bus, Serial Peripheral Interface (SPI) buses, Inter-Integrated Circuit (I2C) bus, Serial Advanced Technology Attachment (SATA) buses, etc., in which the components of server 300 communicate. Further, processor(s) 320 may be coupled with an I/O interface 325 via a communication channel 326, which enables processor(s) 320 to receive input data from an I/O device. Communication channel 326 can include UART hardware buses similar to communication channel 226 of FIG. 2A.

Server 300 may further include a communication space 380, which can be accessible by each of processor(s) 320, secure device 360, memory controller 366, and non-secure device 370. Communication space 380 may facilitate communication between an entry point device (e.g., processor(s) 320, non-secure device 370, etc.) and other devices (e.g., storage devices 330, secure device 360, etc.) in a secure environment. For example, the devices of server 300 can write communication data to be acquired by storage devices 330 and/or secure device 360 at communication space 380. The devices can also read communication data written by another device at communication space 380. The reading and writing of communication data can be part of a memory-based communication transaction between the two devices. Communication space 380 may be implemented as being part of storage devices 330 (e.g., storage devices 330b) and can be accessible by other devices via memory controller 366 as shown in FIG. 3A. In some examples, communication space 380 may be implemented on a separate memory device and can be accessible by other devices via other memory controllers (not shown in FIG. 3A). Communication space 380 can be implemented on a volatile memory (e.g., a DRAM, an SRAM, etc.), a non-volatile memory (e.g., SSD, SCM, etc.), or a mixture of both.

In some examples, the connection between communication space 380 and communication channel 310 can be regulated by processing logic such as, for example, a controller, a multiplexer, etc. (not shown in FIG. 3). For example, in a case where communication space 380 is implemented on a non-volatile storage device (e.g., a flash drive), the processing logic can control access of communication space 380 by different components of server 300. Such arrangements can, for example, control the write and read operations to communication space 380 to resolve read/write conflicts, and can also enhance security. For example, the processing logic can decline an authorized request to communication space 380 and close the connection between communication channel 310 and communication space 380. In some examples, the processing logic can be coupled with a slow bus (e.g., I2C bus) which accepts an access request (e.g., a write request, a read request, etc.) for communication space 380 from a requester device. Upon approving the access request, the connection between communication channel 310 and communication space 380 can be enabled, which allows the requester device to transmit large volume of memory-based communication transaction data via communication channel 310 to communication space 380 for storage.

There are different ways by which the devices of server 300 can be triggered to perform read operation on communication space 380 to obtain the communication data written by other devices. For example, a device may perform a read operation to a particular address/region of communication space 380 periodically. As another example, a memory controller (e.g., memory controller 366, or other controllers) that manages access to communication space 380 can also detect a write operation and, upon detecting the write operation, transmit a notification signal to one or more devices of server 300 to notify them about the write operation. The transmission of the notification signal may include, for example, generating an interrupt at the devices, storing the notification signal at a register which a device of server 300 can monitor periodically, etc. Upon receiving the notification signal, the device can then perform the read operation.

The communication between the devices can be used to facilitate, for example, troubleshooting and software update operations. For example, non-secure device 370, configured as an entry point device, may be used to establish a remote debug session with secure device 360. Non-secure device 370 may include a micro-controller 375, which can include a processor or other processing logic capable of executing instructions to establish the remote debug session. Non-secure device 370 may also include a network interface 390 to communicate with a remote device. To perform the troubleshooting operations, non-secure device 370 may receive, from a remote device via network interface 390, a request to establish the debug session. Non-secure device 370 may store the request at communication space 380. Secure device 360 may acquire the request from communication space 380, process the request, and store certain data (e.g., data related to an operation of secure device 360) at communication space 380 in response to the request. Non-secure device 370 can then acquire the data from communication space 380 and transmit the data back to the remote device over the network.

As another example, non-secure device 370 may receive a set of new bootloader software codes from the remote device, and store the set of new bootloader software codes at communication space 380. In some examples, non-secure device 370 may also store a notification at communication space 380 to control a controller that manages storage device 330a to copy the set of new bootloader software codes into storage device 330a, to update the stored bootloader software codes. Non-secure device 370 may also store a notification at communication space 380 to notify processor(s) 320 to load the set of new bootloader software codes from storage device 330a (or directly from communication space 380) for execution.

As another example, processor(s) 320 can also establish a debug session with secure device 360 using communication space 380. For example, a local operator can input, via I/O interface 325, a request to establish the debug session to processor(s) 320, which can then store the request at communication space 380. Secure device 360 may acquire the request from communication space 380, process the request, and store certain data (e.g., data related to an operation of secure device 360) at communication space 380 in response to the request. Processor(s) 320 can then acquire the data from communication space 380 and transmit the data back to the local operator via I/O interface 325.

In some examples, the entry point devices (e.g., processor(s) 320, adapter device 370, etc.) can perform one or more operations prior to the memory-based communication transaction to improve security. For example, to reduce security threats, only a limited set of operators is allowed to use the entry point devices to perform the aforementioned software update and troubleshooting operations. The credentials of the limited set of operators can be stored in a database (not shown in FIG. 3A), in which the credentials can be categorized for the specific operation(s) the operators are authorized to perform. An operator seeking to start the aforementioned software update and troubleshooting operations can transmit a request include his or her credential information in a request to the entry point device. The entry point devices can refer to the database to authenticate the operator, and to determine that the operator is authorized to perform the requested operation. If the entry point devices authenticate the operator and determine that the operator is authorized to perform the requested operation, the entry point devices can start the memory-based communication transaction by, for example, storing the request or other related data in communication space 380.

In some examples, the entry point devices can also perform one or more operations as part of the memory-based communication transaction to further improve security. For example, as part of the memory-based communication transaction, the entry point device may perform a handshake process with a target device to be accessed by the operator (e.g., memory controller 366, secure device 360) for an operation. The handshake process can be performed using communication space 380 and enables the target device to authenticate the entry point device, and that the entry point device (and the operator) is authorized to perform the operation with the target device. As an illustrative example, secure device 360 can maintain, in a local memory, the identifiers of a list of devices allowed to request for a debug session (e.g., media access control (MAC) addresses). The entry point device can store, as part of a request to establish the debug session, the MAC address of the entry point device in communication space 380. Secure device 360 can then determine whether to accept the request based on whether the MAC address in the request is in the list. If it is, secure device 360 can accept the request and store debug data at communication space 380 to be read by the entry point device. Otherwise, secure device 360 can also store a message indicating the request is denied at communication space 380, which can also be read by the entry point device at a later time.

In some examples, the handshake process can also be used by the entry point device to authenticate the target device. For example, as part of the handshake process, the entry point device may also store a request to the target device for an identifier (e.g., a MAC address) of the target device, to enable the entry point device to confirm the other party of the handshake process is the target device designated to have the subsequent communication transaction. Upon authenticating the target device, the entry point device may store other information, such as the address of data to be stored by the entry point device for the target device, in communication space 380, to complete the handshake process. The target device can then access communication space 380 based on the address to obtain the data as part of the communication transaction.

In some examples, the security of the handshake process can be further enhanced by implementing additional security measures. In one example, the credential information provided by the entry point device can be encrypted. The entry point device can encrypt the credential information using a public key of the target device. The target device can then decrypt the credential information using its own private key. In some examples, both the entry point device and the target device can also get the private key from a trusted third party. Such arrangements can prevent, for example, an imposter device from sending out the credential information of an entry point device to deceive the target device into establishing the communication transaction. As another example, the target device can transmit a challenge question to the entry point device targeted at a user requesting for remote access. The target device can grant the communication transaction only when receiving a correct answer to the challenge question from the entry point device.

Figure 4:
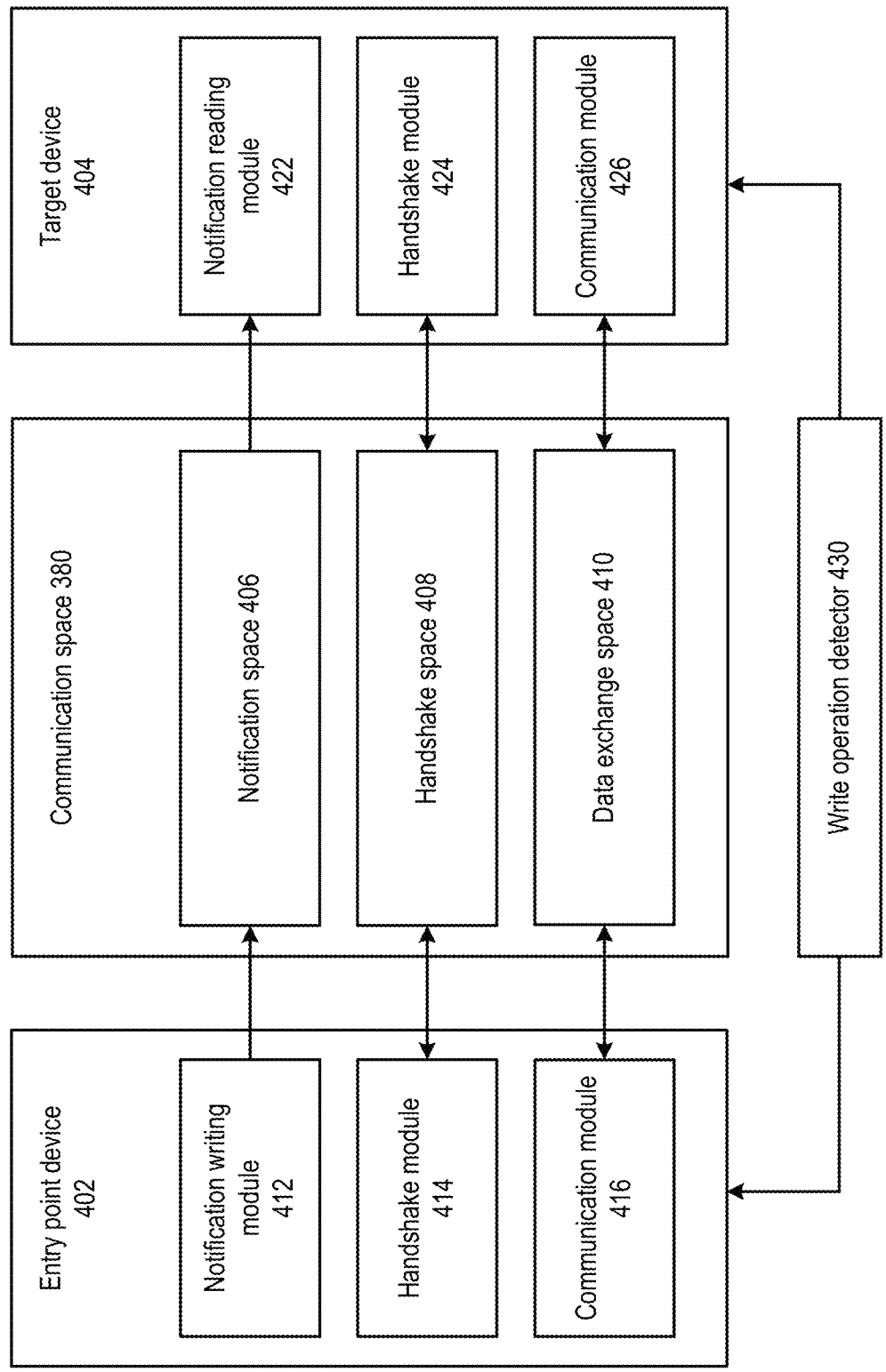
FIG. 4 is a simplified block diagram of some of the internal devices of FIG. 3, according to certain aspects of the present disclosure.

FIG. 4 illustrates examples of components of the devices involved in a memory-based communication transaction. As shown in FIG. 4, communication space 380 can be used by an entry point device 402 (e.g., processor(s) 320, adapter device 370, etc.) to perform a communication transaction with a target device 404 (e.g., secure device 360, memory controller 366, etc.). Communication space 380 may include a notification space 406, a handshake space 408, and a data exchange space 410. Notification space 406 is to be provided to entry point device 402 to store a notification to notify target device 404 to start a communication transaction. Handshake space 408 can be used by entry point device 402 and target device 404 to perform the handshake process for authentication and authorization, as described above. For example, entry point device 402 and target device 404 can provide their respective MAC addresses to each other via handshake space 408, and to store an indicator to indicate to a state of the handshake process (e.g., whether both devices are authenticated). Data exchange space 410 enable data exchange between entry point device 402 and target device 404 for the communication transaction. For example, as part of the debugging process, entry point device 402 may store information related to a request for debug data (e.g., an address in a local memory of secure device 360) in data exchange space 410, whereas target device 404 can also store the requested debug data in data exchange space 410. In addition, entry point device 402 may store a set of new bootloader software codes in data exchange space 410, whereas target device 404 can also store an indication of complete transfer after the target device acquires the set of new bootloader software codes from data exchange space 410.

In some examples, at least part of communication space 380 can be a shared space among the devices of server 300. For example, notification space 406 can be a shared space, and a device of server 300 can access notification space 406 to determine whether a notification to establish a communication transaction with that device is stored. In some examples, each of notification space 406, handshake space 408, and data exchange space 410 can be partitioned into private spaces. Each of the private spaces is allocated to one target device and is accessible only by the entry point devices and that target device. For example, a set of secure devices 360 can refer to different partitions of notification space 406, handshake space 408, and data exchange space 410. In some examples, data exchange space 410 can be dynamically allocated based on a result of the handshake process. For example, upon successfully authenticating both the entry point device and the target device, the entry point device (or other management devices such as memory controller 366) can allocate a space at a memory device to be provided as data exchange space 410 for the subsequent communication transaction. The entry point device can receive an address of the allocated space and provide the address to the target device to complete the handshake process, as described above.

In addition, entry point device 402 can include internal components (which can be software and/or hardware modules) to support the communication transaction. For example, the internal components can be software instructions executable by a processor (e.g., processor(s) 320, micro-controller 375, etc.). As shown in FIG. 3, entry point device 402 may include a notification writing module 412 to store a notification at notifications space 406 to start a communication transaction. Entry point device 402 may also include a handshake module 414 to store and acquire handshake data (e.g., MAC addresses) at handshake space 408 to perform the handshake process with target device 404. Entry point device 402 may further include a communication module 416 to store data (e.g., debug data address, bootloader code, etc.) and read data (e.g., debug data, confirmation of bootloader code transfer, etc.) at data exchange space 410 to perform the communication transaction. Communication module 416 can also perform other operations such as, for example, obtaining the addresses of data exchange space 410 (e.g., by performing memory allocation or from other management devices) and providing the addresses to handshake module 414, which can provide the addresses to target device 404 (via handshake 408) to complete the handshake process.

Moreover, target device 404 can also internal components (which can be software and/or hardware modules) to support the communication transaction. For example, the internal components can be software instructions executable by a processor (e.g., micro-controller 362). As shown in FIG. 3, target device 404 may include a notification reading module 422 to perform read operations to notification space 406 to obtain a notification. Target device 404 may also include a handshake module 424 to store and acquire handshake data (e.g., MAC addresses, address of data exchange space 410, etc.) at handshake space 408 to perform the handshake process with entry point device 402. Entry point device 402 may further include a communication module 426 to store data (e.g., debug data, confirmation of bootloader code transfer, etc.) and read data (e.g., debug data address, bootloader code, etc.) at data exchange space 410 to perform the communication transaction. In some examples, notification reading module 422 and/or handshake module 424 can also prepare target device 404 for the subsequent communication transaction. For example, in a case where target device 404 has a debug mode and a normal operation mode, notification reading module 422 can suspend the normal operation mode and set target device 404 to operate under the debug mode after obtaining the notification from notification space 406. In some examples, handshake module 424 can also set target device 404 to operate under the debug mode after completion of the handshake process. In both cases, target device 404 can enter the debug mode and respond to subsequent requests for debug data from entry point device 402.

In addition, there are different ways by which entry point device 402 and target device 404 are triggered to perform read operations to communication space 380, as described above. In some examples, each entry point device 402 and target device 404 can perform read operations at communication space 380 periodically to monitor for new data. In some examples, as shown in FIG. 4, communication space 380 can be coupled to a write operation detector 430 (which can be part of a memory controller, such as memory controller 366). In some examples, write operation detector 430 can detect write operations at each of notifications space 406, handshake space 408, and data exchange space 410 and determine the source of the write operations, and notify the appropriate modules and device accordingly. For example, write operation detector 430 can detect that notification writing module 412 performs a write operation at notifications space 406 for target device 404 to store a notification, and notify notification reading module 422 of target device 404 about the write operation. Write operation detector 430 can also detect, for example, target device 404 performs a write operation to one of handshake space 408 or data exchange space 410 for entry point device 402, and notify one of handshake module 414 or communication module 416 about the write operation. The notification of write operation can be performed by, for example, transmitting an interrupt signal, storing a notification at register, etc.

Methods

Figure 5:
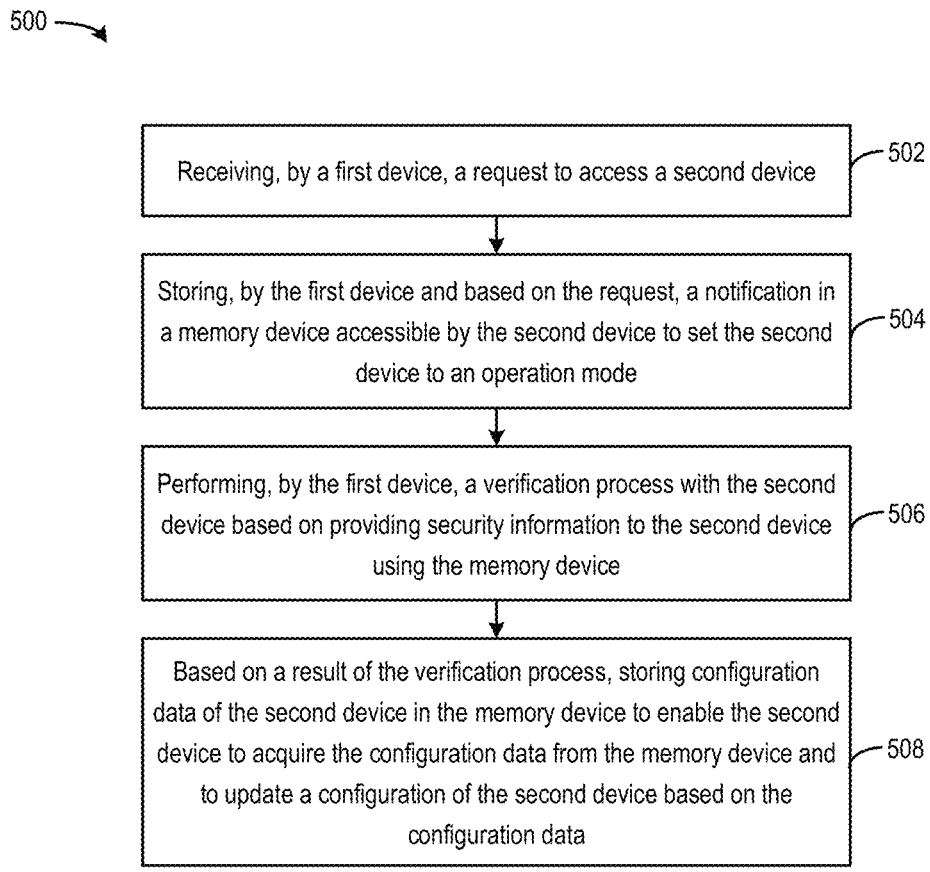
FIG. 5 illustrates an example flow diagram of a process for communication with internal components of a server in a secure environment, according to certain aspects of the present disclosure.

FIG. 5 illustrates an example flow diagram of a process 500 to provide communication between devices in a secure environment. Process 500 can be performed by, for example, a first device (e.g., entry point device 402 of FIG. 4) to communicate with a second device (e.g., target device 404 of FIG. 4). The communication is for controlling a function of the second device and may include, for example, troubleshooting the second device, updating the function of the second device (e.g., by updating the firmware codes stored in the second device), etc. Both the first device and the second device can be a component of a server (e.g., server 300 of FIG. 3) configured to provide compute service.

At operation 502, the first device receives a request to access the second device. The request may be received from a remote device via a network (e.g., in a case where the first device is adapter device 370 of FIG. 3). The request may also be received locally via an I/O device (e.g., in case where the first device is processor(s) 320 of FIG. 3).

In some examples, a communication channel (e.g., one of communication channels 310, 326, or 328, which can be implemented on a hardware bus) may exist between the first device and the second device, but the communication channel does not allow the first device to access the second device according to the request due to, for example, restriction from the secure environment, the communication channel being incompatible or have insufficient bandwidth to support the access, etc.

At operation 504, the first device stores, based on the request, a notification in a memory device accessible by the second device to set the second device to an operation mode. The memory device may be configured to provide a communication space (e.g., communication space 380 of FIG. 3) which may include a notification space. The notification space can be shared by other devices within the server, or can be assigned to the second device only (e.g., other devices may have their notification spaces created at other addresses of the memory device). In some examples, the second device may monitor the notification space periodically to monitor for a new notification. In some examples, the communication space may be coupled with a write operation detector (e.g., write operation detector 430) which can detect the write operation performed by the first device at operation 502 and transmit a signal (e.g., an interrupt) to notify the second device about the write operation. In addition, the operation mode may be set to prepare the second device for the subsequent communication (e.g., to enter a debug mode to provide debug data to the first device in response to a debug data request).

Optionally, at operation 506, the first device performs a verification process with the second device based on providing security information the second device using the memory device. The verification process can be part of a handshake process between the first device and the second device conducted using a handshake space (e.g., handshake space 408) of the memory device. The verification process may allow the second device to authenticate the first device and to confirm that the first device is authorized to perform the requested access to the second device. For example, as part of the handshake process, the second device may store a request for certain credential information (e.g., the MAC address) at the handshake space. The first device, upon obtaining the request, and store its credential information at the handshake space. The second device can obtain the credential information and compare that with a list of devices allowed for the requested access. Upon authenticating and authorizing the first device, the second device can store an indicator at the handshake space indicating that the handshake is successful. Based on this indicator, the first device can proceed with the subsequent communication.

In some examples, the second device may also transmit its credential information to the first device to enable the first device to verify that the second device is eligible to process the access request (e.g., to receive a set of new bootloader software codes). Upon verifying that the second device is eligible to process the access request, the first device may also transmit information related to the subsequent communication including, for example, an address of a data exchange space (e.g., data exchange space 410) at which the first device is to store data (e.g., new bootloader codes) to be acquired by the second device, to complete the handshake process.

At operation 508, based on a result of the verification process, the first device may store configuration data of the second device in the memory device to enable the second device to acquire the configuration data from the memory device and to update a configuration of the second device based on the configuration data. The configuration data may include, for example, a debug data request to configure/program the second device to provide the requested debug data. The configuration data may also include new firmware codes (e.g., bootloader software codes) to be executed by the second device. The configuration data may be stored in the data exchange space accessible by the second device.

Computing Systems

Figure 6:
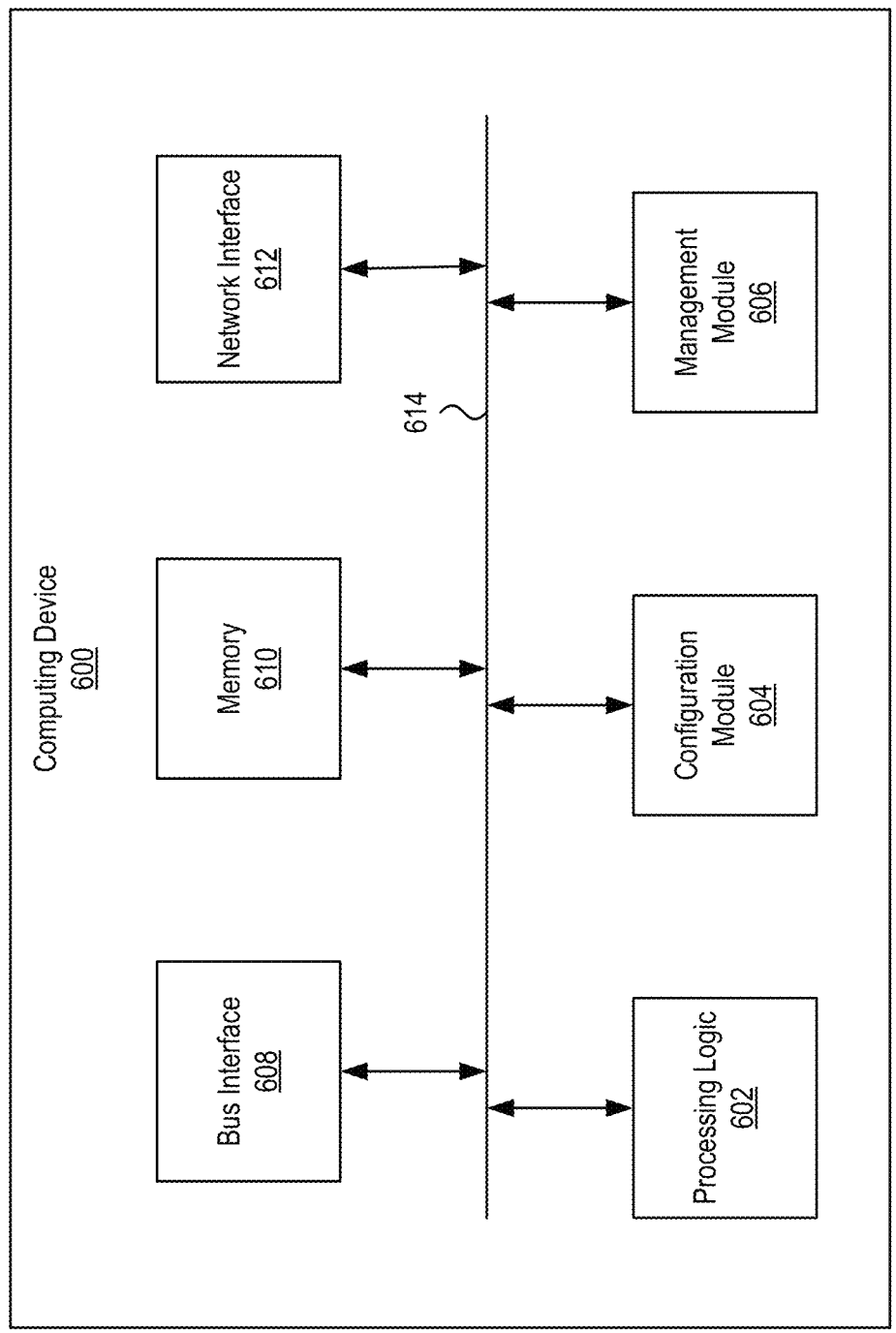
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. A computing device 600 may facilitate processing of packets and/or forwarding of packets from the computing device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 600 may be the recipient and/or generator of packets. In some implementations, the computing device 600 may modify the contents of the packet before forwarding the packet to another device. The computing device 600 may be a peripheral device coupled to another computer device, a switch, a router or any other suitable device enabled for receiving and forwarding packets. Computing device 600 may implement, for example, entry point device 402 and target device 404 of FIG. 4.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, not illustrated here, such as components discussed with respect to the nodes disclosed in FIG. 7. In some implementations, the computing device 600 may include fewer modules. In some implementations, one or more of the modules may be combined into one module. One or more of the modules may be in communication with each other over a communication channel 614. The communication channel 614 may include one or more buses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example buses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
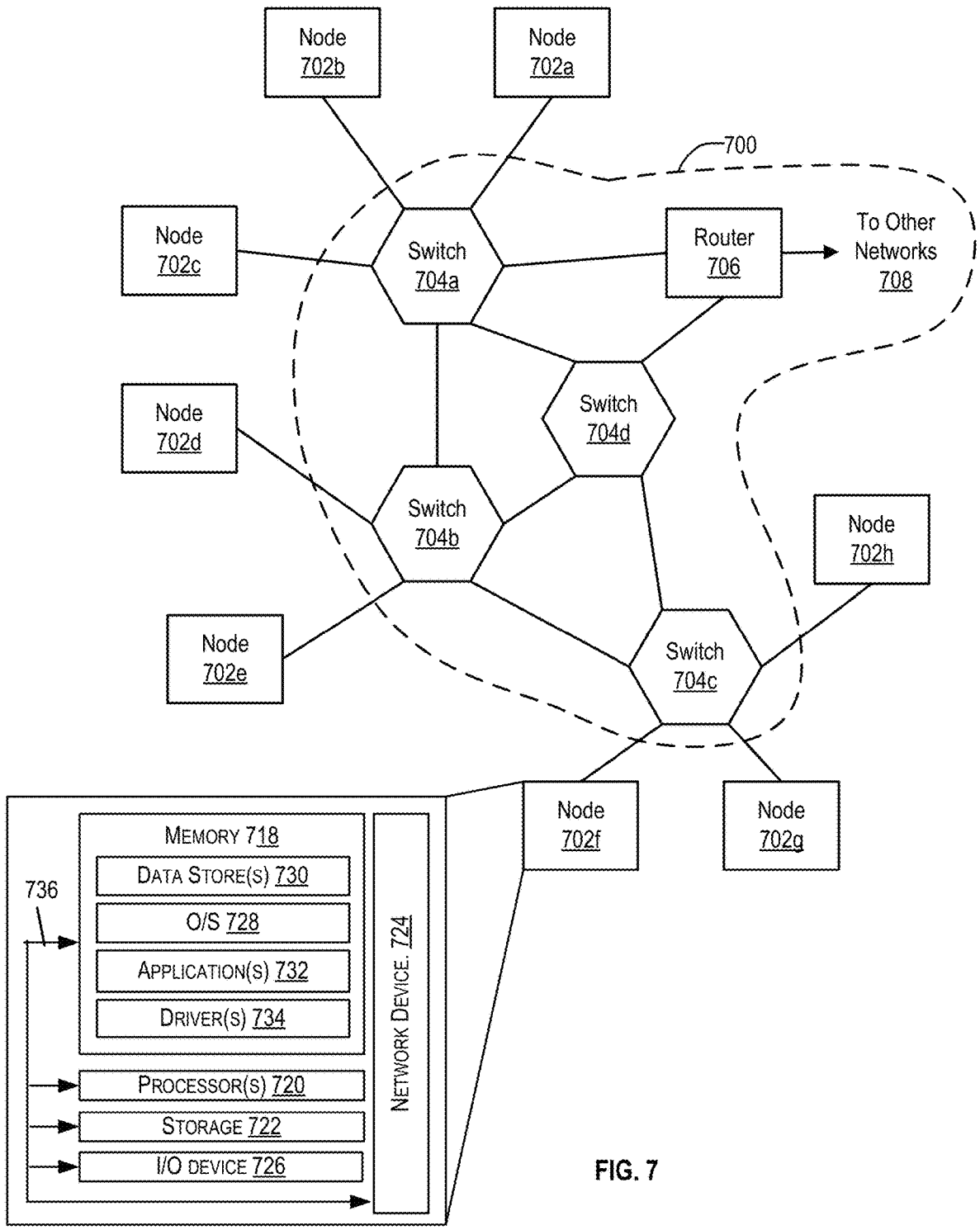
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A computing device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704a-704d may be connected to a plurality of nodes 702a-702h and provide multiple paths between any two nodes. Each node may include, for example, server 300 of FIG. 3.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s)

may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702a-702h may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702a-702h, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702a-702h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702a-702h or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 724 that allow the node(s) 702a-702h to communicate with a stored database, another computing device or server, user terminals and/or other devices on the network(s) 700. The network device(s) 724 of FIG. 7 may include similar components discussed with reference to the computing device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
    a storage in a server;
    a first component in the server, the first component being isolated in a secure environment in the server; and
    a hardware entry point device authorized to access the first component via the secure environment and configured to:
        responsive to receiving a request to access the first component:
            store a notification in a region of the storage accessible by the first component, wherein the notification is to be read by the first component from the storage to set the first component to an operation mode;
            responsive to setting the first component to the operation mode, perform a handshake process with the first component, based on acquiring first handshake information provided by the first component from the storage, and store second handshake information for the first component in the storage; and
            responsive to completing the handshake process, store operation data in the storage, wherein the operation data is to be acquired by the first component from the storage to control an operation of the first component in the operation mode.

2. The system of claim 1, further comprising a second component in the server;
    wherein:
        the region of the storage is accessible by the first component and the second component;
        the notification is a first notification;
        the operation mode is a first operation mode; and
        the hardware entry point device is further configured to:
            responsive to receiving a request to access the second component, store a second notification in the region of the storage, wherein the second notification is to be acquired by the second component from the storage to set the second component to a second operation mode.

3. The system of claim 1, further comprising a second component in the server;
    wherein:
        the region of the storage is a first region inaccessible by the second component;
        the storage further includes a second region accessible by the second component;
        the notification is a first notification;
        the operation mode is a first operation mode; and
        the hardware entry point device is further configured to:
            responsive to receiving a request to access the second component, store a second notification in the second region, wherein the second notification is to be acquired by the second component from the second region of the storage to set the second component to a second operation mode.

4. The system of claim 1, wherein the first handshake information includes a first request for data to authenticate the hardware entry point device and a second request for data to authorize an operator of the hardware entry point device to control the operation of the first component; and
    wherein the second handshake information includes an identifier of the hardware entry point device and a passcode assigned to the operator.

5. The system of claim 1, wherein the first component is configured to execute a first set of software codes prior to the hardware entry point device receiving the request to access the first component; and
    wherein the operation data includes a second set of software codes to be executed by the first component.

6. A system comprising:
    a storage;
    a first hardware device; and
    a second hardware device;
        wherein the storage includes a first region that is accessible to the second hardware device and inaccessible to a third hardware device, and a second region that is inaccessible to the second hardware device and accessible to the third hardware device; and
        wherein the first hardware device is configured to:
            receive an access request targeted at the second hardware device;
            based on the access request, store a notification in the first region of the storage to notify the second hardware device of the access request; and
            store, in the first region of the storage, control data to be acquired by the second hardware device based on the notification, wherein the control data is configured to control a function of the second hardware device.

7. The system of claim 6,
wherein:
the access request is a first access request;
the notification is a first notification;
the control data is first control data; and
the first hardware device is further configured to:
receive a second access request targeted at the third hardware device;
based on the second access request, store a second notification in the second region of the storage to notify the third hardware device of the second access request; and
store, in the second region of the storage, second control data to be acquired by the third hardware device based on the second notification, wherein the second control data is configured to control a function of the third hardware device.

8. The system of claim 6, wherein the second hardware device is configured to access the storage periodically to monitor for the notification.

9. The system of claim 6, wherein the second hardware device is configured to receive an interrupt signal to notify the second hardware device to access the storage for the notification.

10. The system of claim 6, wherein the storage comprises a volatile memory device.

11. The system of claim 6, wherein the storage comprises a non-volatile memory device.

12. The system of claim 6, further comprising a hardware bus;
wherein the first hardware device and the second hardware device are coupled with the hardware bus; and
wherein the control data are not transmitted over the hardware bus from the first hardware device to the second hardware device for the access request.

13. The system of claim 6, further comprising a first hardware bus, a second hardware bus, and processing logic;
wherein the processing logic is coupled with the first hardware bus and with the second hardware bus and is configured to:
receive a request from the first hardware device to access the storage via the second hardware bus;
determine whether to grant the request based on a pre-determined access policy of the storage; and
responsive to granting the request, forward the control data received from the first hardware bus to the storage.

14. The system of claim 6, wherein the first hardware device is configured to:
perform a security verification process with the second hardware device using the storage; and
based on a result of the security verification process, store the control data in the storage.

15. The system of claim 14, wherein the security verification process comprises:
the second hardware device storing a request for credential information in the storage;
the first hardware device acquiring the request for credential information from the storage;
the first hardware device storing a response to the request for credential information in the storage; and
the second hardware device storing the result of the security verification process based on the response acquired from the storage.

16. The system of claim 6, wherein the first hardware device is configured to:
store the control data for controlling the second hardware device to store status data of an operation at the storage; and
acquire the status data from the storage.

17. The system of claim 6, wherein the first hardware device is configured to store the control data comprising a set of software instructions to be acquired by the second hardware device for execution based on the notification.

18. The system of claim 17, wherein the set of software instructions is a first set of software instructions; and
wherein the second hardware device is configured to execute a second set of software instructions prior to acquiring the notification.

19. A method, comprising:
receiving, by a first hardware device, a request to access a second hardware device;
storing, by the first hardware device and based on the request, a notification in a storage accessible by the second hardware device to set the second hardware device to an operation mode;
performing, by the first hardware device, a verification process with the second hardware device based on providing security information to the second hardware device using the storage; and
based on a result of the verification process, storing configuration data of the second hardware device in the storage to enable the second hardware device to acquire the configuration data from the storage and to update a configuration of the second hardware device based on the configuration data.

20. An apparatus, comprising:
a first hardware interface;
a second hardware interface coupled with a storage; and
a hardware processor configured to execute a set of instructions to:
receive, via the first hardware interface, a request to access a second hardware device;
store, based on the request, a notification in the storage to set the second hardware device to an operation mode;
perform a verification process with the second hardware device based on providing security information to the second hardware device using the storage; and
based on a result of the verification process, store configuration data of the second hardware device in the storage to enable the second hardware device to acquire the configuration data from the storage and to update a function of the second hardware device based on the configuration data.

* * * * *